(12) United States Patent
Wang et al.

(10) Patent No.: US 7,032,225 B2
(45) Date of Patent: Apr. 18, 2006

(54) OBJECT-ORIENTED FRAMEWORK FOR DOCUMENT ROUTING SERVICE IN A CONTENT MANAGEMENT SYSTEM

(75) Inventors: Fang-Yi Wang, San Jose, CA (US); Alan Tsu-I Yaung, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 666 days.

(21) Appl. No.: 10/131,167

(22) Filed: Apr. 23, 2002

(65) Prior Publication Data

US 2003/0204646 A1   Oct. 30, 2003

(51) Int. Cl.
*G06F 9/44* (2006.01)
(52) U.S. Cl. ...................................... 719/315; 709/206
(58) Field of Classification Search ................ 719/328, 719/315, 316; 709/238, 206
See application file for complete search history.

(56) References Cited

U.S. PATENT DOCUMENTS

| 5,638,504 | A | * | 6/1997 | Scott et al. ................... 715/530 |
| 5,768,505 | A | | 6/1998 | Gilchrist et al. ........ 395/200.31 |
| 5,848,271 | A | | 12/1998 | Caruso et al. .............. 395/680 |
| 5,884,046 | A | | 3/1999 | Antonov ................. 395/200.68 |
| 6,073,142 | A | | 6/2000 | Geiger et al. ............... 707/500 |
| 6,185,603 | B1 | * | 2/2001 | Henderson et al. ......... 709/206 |
| 6,262,729 | B1 | * | 7/2001 | Marcos et al. .............. 715/744 |
| 6,266,667 | B1 | | 7/2001 | Olsson ......................... 707/10 |
| 6,327,611 | B1 | * | 12/2001 | Everingham ................. 709/206 |
| 2001/0013069 | A1 | * | 8/2001 | Shah ........................... 709/238 |
| 2002/0002590 | A1 | * | 1/2002 | King et al. .................. 709/206 |
| 2002/0023135 | A1 | * | 2/2002 | Shuster ....................... 709/206 |
| 2003/0220875 | A1 | * | 11/2003 | Lam et al. ..................... 705/45 |

\* cited by examiner

*Primary Examiner*—W. Thomson
*Assistant Examiner*—Phuong N. Hoang
(74) *Attorney, Agent, or Firm*—Samuel A. Kassatly

(57) ABSTRACT

An object-oriented framework for document routing service in a content management system directly provides the server API set for document routing to the application programmers, without an intermediate interface layer. This framework provides document routing functions and system administration support for document routing. In addition, the system defines the document routing process as a series of steps provided by an administrator through which a document is routed, where a work node is a step within the process. A work list is provided that is a filter of one or more work nodes; a user may obtain a list of work or the "next" work item from the work list. Work packages can be suspended pending the satisfaction of criteria such as delay time or collection of a specified group of documents. The process can be resumed at any time. Suspension and resumption of the process are defined by the resume list in the work package and the work node. The object-oriented framework defines the object model of the document routing service that includes a set of classes and associated methods to support the model.

7 Claims, 5 Drawing Sheets

OBJECT-ORIENTED FRAMEWORK FOR DOCUMENT ROUTING SERVICE IN A CONTENT MANAGEMENT SYSTEM

FIELD OF THE INVENTION

The present invention generally relates to electronic document routing within a network or content management system, and particularly to a software system and associated method for routing documents and objects. More specifically, this invention pertains to the routing of documents and objects through a finite number of stages or routings as defined by the user.

BACKGROUND OF THE INVENTION

Document routing is important to the day-to-day operations of a content management system. Without the document routing capability, a content management system would merely become a document archival system. Document routing is similar to workflow. As an example, a claim is submitted to an insurance company for an auto accident. Most likely, finite stages or routings are required to obtain the necessary approvals for paying the insurance claim, depending on the type of claim or damage incurred. Document routing must be capable of identifying a sequence of finite steps through which the document is routed.

An important distinction between current workflow systems and document routing is that document routing provides added functionality, whereas current workflow systems require an interface between the server and the API (application programming interface) that routes the workflow documents. This interface layer, C API, is typically written in C, and allows users to use the server. The drawback to this latter approach is that two interfaces are required: one at the server layer and the other at the middle tier layer. The middle tier layer is the object-oriented application programming interface, or OO API in Java or C++. Because more interfaces are added to the server, processing time is increased and server resources are consumed.

To minimize processing time and maximize server resources, a document routing system is needed that is build on top of the server without an intermediate interface layer. The need for such a system has heretofore remained unsatisfied.

SUMMARY OF THE INVENTION

The system and associated method of the present invention satisfy this need, and provide an object-oriented framework for document routing service in a content management system. According to the present method, the object-oriented framework directly provides the server API set for document routing to the application programmers, without an intermediate interface (e.g., C API layer).

The object-oriented framework defines the overall architectural design of document routing. This framework provides the following representations or functions:

document routing functions;

system administration support for document routing;

the object-oriented representation of a process in document routing where a process is defined as a series of steps defined by an administrator through which a document is routed;

the object oriented representation of a work node in document routing where a work node is a step within a process;

the object-oriented representation of a work list in document routing where a work list is a filter of one or more work nodes from which a user obtains a list of work or the "next" work item;

the object-oriented representation of a work package in document routing where a work package is the routing element that consists of a set of information such as priority, state, resume time, and item ID being routed between work nodes in a process;

the object-oriented representation of an entry of the route list in a process in document routing;

the object-oriented representation of an entry of the resume list in a work package; and the object-oriented representation of an entry of the resume list in a work node.

The object-oriented framework defines the object model of the document routing service that includes a set of classes and associated methods to support the model. The object-oriented framework presents several advantages among which are that it provides the document routing function to users based on an object-oriented framework, and it enables application development with document routing service.

The foregoing and other features and advantages of the present invention are realized by a document routing process that is defined as a series of steps provided by an administrator through which a document or object is routed, where a work node is a step within the process. A work list is provided that is a filter of one or more work nodes; a user may obtain a list of work or the "next" work item from the work list. Work packages can be suspended pending the satisfaction of criteria such as delay time or collection of a specified group of documents. The process can be resumed at any time. Suspension and resumption of the process are defined by the resume list in the work package and the work node.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Class: In object-oriented technology, a user-defined data type that defines a collection of objects that share the same characteristics. An object, or class member, is one instance of the class. Concrete classes are designed to be instantiated.

Document: any item that can be electronically digitized including audio, video, pictures, text, etc.

Instance: In object-oriented technology, a member of a class; for example, "Lassie" is an instance of the class "dog." When an instance is created, the initial values of its instance variables are assigned.

Instantiate: In object-oriented technology, to create an object of a specific class.

Internet: A collection of interconnected public and private computer networks that are linked together with routers by a set of standards protocols to form a global, distributed network.

Method: In object-oriented programming, a procedure that is executed when an object receives a message. A method is similar to a procedure, function, or routine in procedural programming languages. The only difference is that in object-oriented programming, a method is always associated with a class.

Object: Examples of an object include, but are not limited to a document, an audio file, a video file, or a data file.

Process: A series of steps defined by an administrator through which a document is routed.

Work list: A filter of one or more work nodes from which a user obtains a list of work or the "next" work item.

Work node: A step within a process.

Work package: A routing element that includes a set of information such as priority, state, resume time, and item ID being routed.

Figure 1:
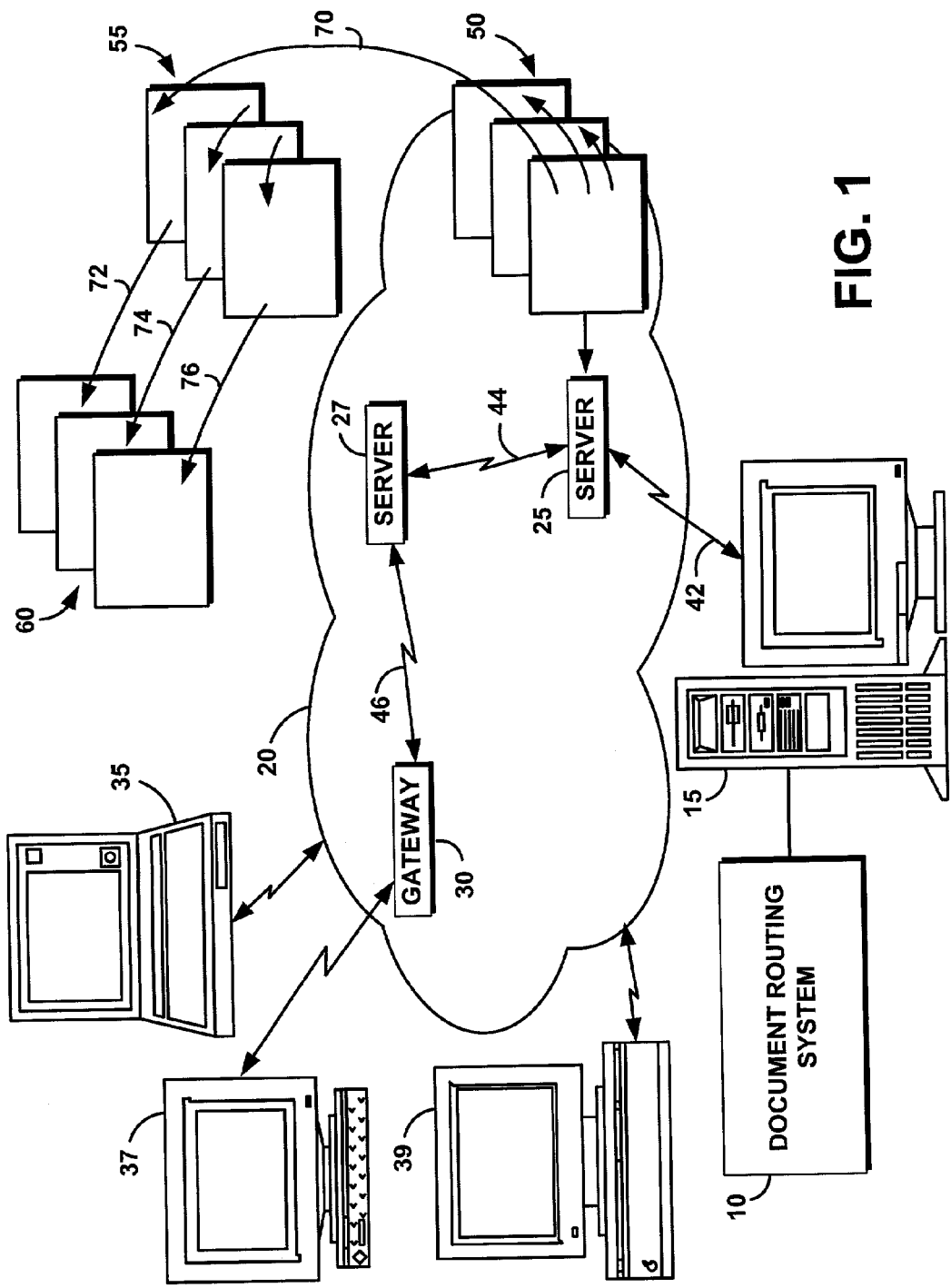
FIG. 1 is a schematic illustration of an exemplary operating environment in which an object-oriented framework for document routing service in a content management system of the present invention can be used.

FIG. 1 portrays an exemplary environment in which an object-oriented framework for a document routing system 10 according to the present invention may be used. The document routing system 10 forms part of a content management system. The system 10 includes a software or computer program product that is typically embedded within or installed on a host server 15. Alternatively, the system 10 can be saved on a suitable storage medium such as a diskette, a CD, a hard drive, or like devices. While the system 10 will be described in connection with the WWW, the system 10 can be used with a stand-alone database of documents or other text sources that may have been derived from the WWW and/or other sources.

The cloud-like communication network 20 is comprised of communication lines and switches connecting servers such as servers 25, 27, to gateways such as gateway 30. The servers 25, 27 and the gateway 30 provide the communication access to the WWW Internet. Users, such as remote Internet users are represented by a variety of computers such as computers 35, 37, 39, and can query the host server 15 for the desired information.

The host server 15 is connected to the network 20 via a communications link such as a telephone, cable, or satellite link. The servers 25, 27 can be connected via high speed Internet network lines 44, 46 to other computers and gateways. The servers 25, 27 provide access to stored information such as hypertext or web documents indicated generally at 50, 55, and 60. The hypertext documents 50, 55, 60 most likely include embedded hypertext link to other locally stored pages, and hypertext links 70, 72, 74, 76 to other webs sites or documents 55, 60 that are stored by various web servers such as the server 27.

Figure 2:
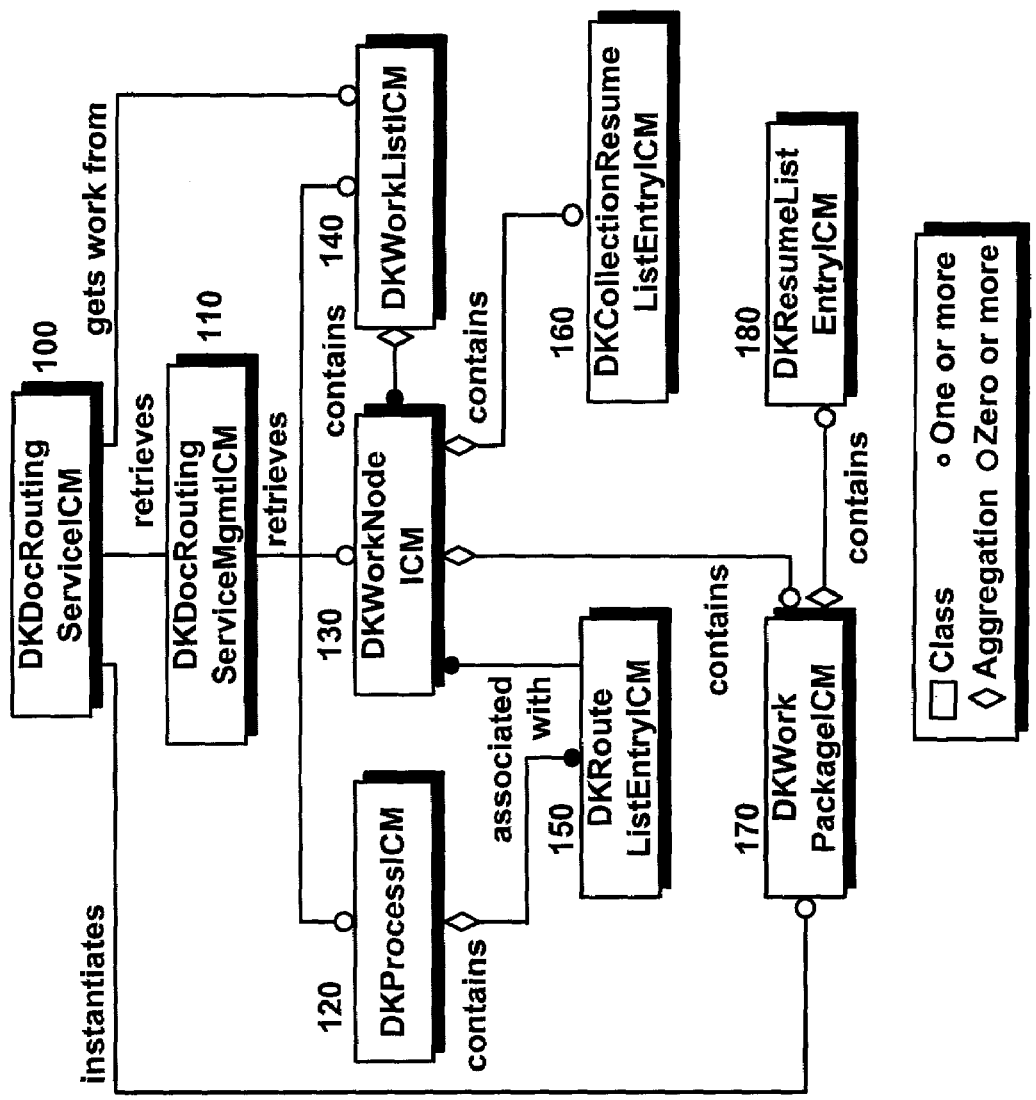
FIG. 2 illustrates a high-level architecture of the system of the invention.

FIG. 2 illustrates a high-level architecture showing the object-oriented document routing system 10 used in the context of an Internet or intranet environment. The system 10 is generally comprised of the following nine classes:

The object-oriented framework includes the following 9 classes, which will be listed and then described in more detail:

DKDocRoutingServiceICM 100, which is the main class that provides document routing functions.

DKDocRoutingServiceMgmtICM 110 that provides system administration support for document routing.

DKProcessICM 120 is an object oriented representation of a process in document routing.

DKWorkNodeICM 130 is an object orientation representation of a work node in document routing.

DKWorkListICM 140 is an object oriented representation of a work list in document routing.

DKRouteListEntryICM 150 is an object oriented representation of an entry of the route list in a process in document routing.

DKCollectionResumeListEntryICM 160 is an object oriented representation of an entry of the resume list in a work node.

DKWorkPackageICM 170 is an object oriented representation of a work package in document routing. This object is being routed between work nodes in a process.

DKResumeListEntryICM 180 is an object oriented representation of an entry of the resume list in a work package.

DKDocRoutingServiceICM class 100 is the main gateway for document routing and provides the basic routing service such as starting, terminating, continuing, suspending, and resuming a process. The DKDocRoutingServiceICM class 100 allows the user to navigate to a finite number of classes associated with the document. Any object-oriented language, such as Java or C++, can be used to interpret the classes of system 10.

From the DKDocRoutingServiceICM class 100, a user can retrieve the DKDocRoutingServiceMgmtICM class 110 that provides system administration support for document routing and methods to manage three main classes or modules: DKProcessICM 120, DKWorkNodeICM 130, and DKWorkListICM 140.

The DKProcessICM class 120 allows the user to define a routing process for a document. It contains a collection of route entries that is defined by the DKRouteListEntryICM class 150. The DKRouteListEntryICM class 150 is associated with a "From" or source work node and a "To" or target work node, represented by the DKWorkNodeICM class 130. For example, routing from nodes N1 to N3 via N2, the workflow would be from node N1 to N2, then from N2 to N3.

The DKWorkNodeICM class 130 is a step in the workflow process, representing only one work node. All the behavior of the nodes is contained in 25 the DKWorkNodeICM class 130. For the example of a routing from node N1 to N3 via N2, three instances (i.e., objects) of the DKWorkNodeICM class 130 would be created. Using DKWorkNodeICM class 130, system 10 defines a sequence of work nodes in the route list. The routing sequence is called a process (i.e., P1).

The DKWorkNodeICM class 130 may contain a collection of the DKCollectionResumeListEntryICM class 160 that defines an entry in the resume list for the work node. When system 10 initiates a process, a work package is created that is defined by the DKWorkPackageICM class 170. The DKWorkPackageICM class 170 may contain a collection of the DKResumeListEntryICM class 180 that defines an entry in the resume list for the work package.

The DKWorkPackageICM class 170 is the basic routing element in the process. Each package is associated with one document; i.e., the package identifies the document. System 10 can view any number of items as a package or document; for example, a folder of documents, an MPEG file, a video, etc. The user specifies which process is required to create the package. The user may also define the work list, the DKWorkListICM 140, where L1 is the work list.

The DKWorkListICM 140 operates as a filter mechanism and tracks or locates the package or document. From the previous example of routing a document from node N1 to N3 via N2, the package may be located at any of the three nodes in the worklist 140. To construct a worklist, the DKWorkListICM 140, system 10 associates one or more work nodes with the worklist, L1. The system 10 tells the worklist which nodes to check, N1, N2, or N3. The user can query the system 10 for the location of the package against L1.

The DKCollectionResumeListEntryICM class 160 can refer to a regular work node or a collection work node. A collection work node is a collection point where the system 10 collects other required documents; the DKCollectionResumeListEntryICM class 160 in effect acts as an automatic suspension stage. Each required document stays at the collection node until all required documents are present. When the required documents have been collected, the requirement is satisfied and the documents may be routed to the next node, depending on the sequence or the DKProcessICM class 120.

The user defines the required documents at the collection point. Without DKCollectionResumeListEntryICM class 160, DKWorkNodeICM class 130 is a regular work node. When DKCollectionResumeListEntryICM class 160 is introduced, DKWorkNodeICM class 130 becomes a collection work node. The DKCollectionResumeListEntryICM class 160 is an entry in the resume list of all the required documents while DKWorkNodeICM class 130 is the node.

The DKResumeListEntryICM class 180 is the resume list; it is associated directly with the package and operates much like a cruise control. DKResumeListEntryICM class 180 will either suspend or resume control, depending on the user specification. For example, the user is routing a pdf file and a doc file. The user might specify that when the pdf file and the doc file arrive, then resume.

Figure 3:
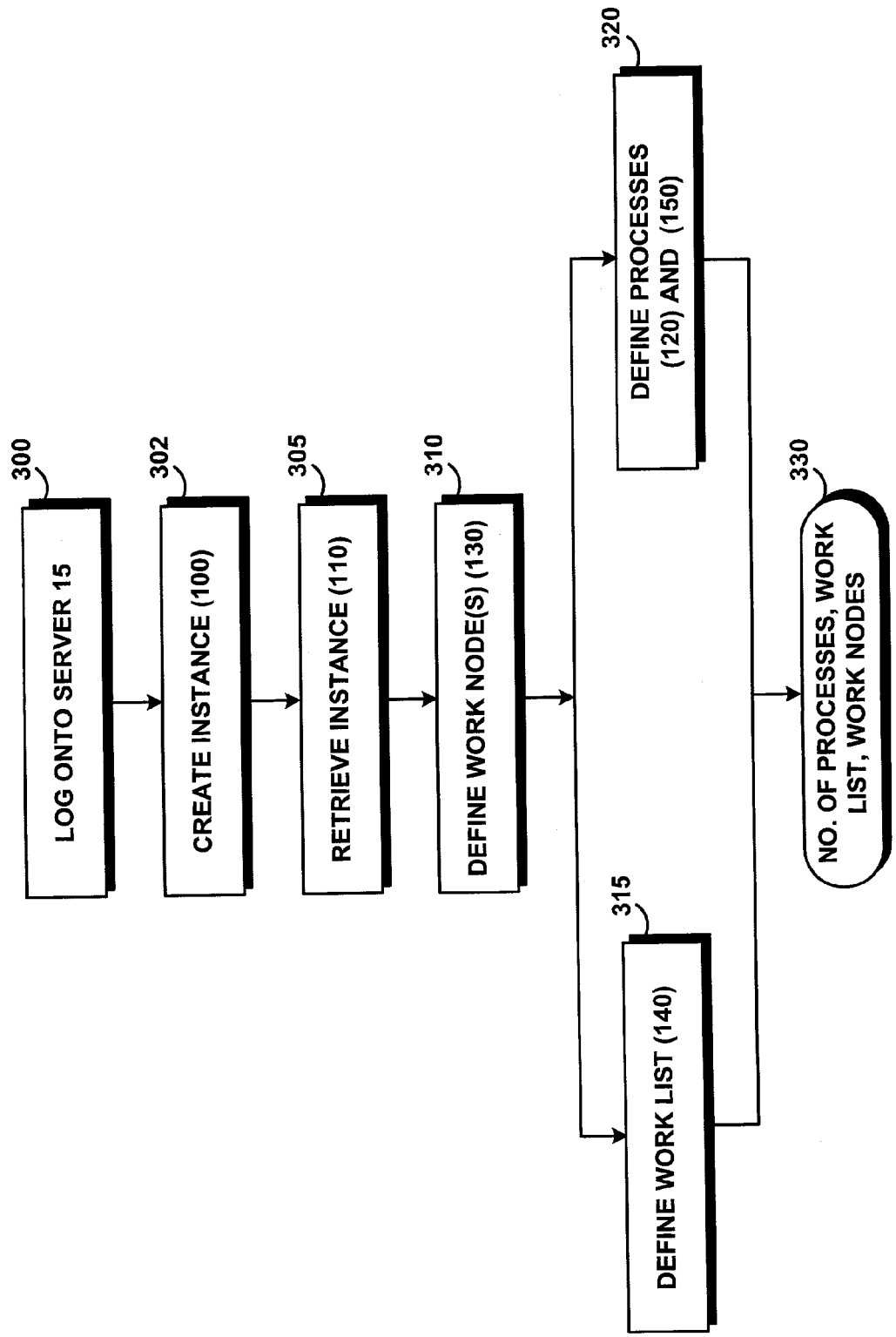
FIG. 3 is a process flow chart illustrating a method of creating document routing objects according to the present invention.

In operation, and with further reference to FIG. 3, the user creates document routing objects by first logging onto the server 15 at step 300. The user creates an instance from DKDocRoutingServiceICM class 100 at step 302. The user then retrieves an instance from DKDocRoutingServiceMgmtICM class 110 at step 305.

At step 310, the user defines the number of DKWorkNodeICM work nodes 130 required to complete the process along with each DKWorkNodeICM work node 130 in the process. The user then defines the work lists in DKWorkListICM class 140 at step 315 and defines the processes DKProcessICM class 120 and DKRouteListEntryICM class 150 at step 320. The output of the method of creating document routing objects is the number of processes 120 and 150, the work list 140, and the number and definition of work nodes 130.

Figure 4:
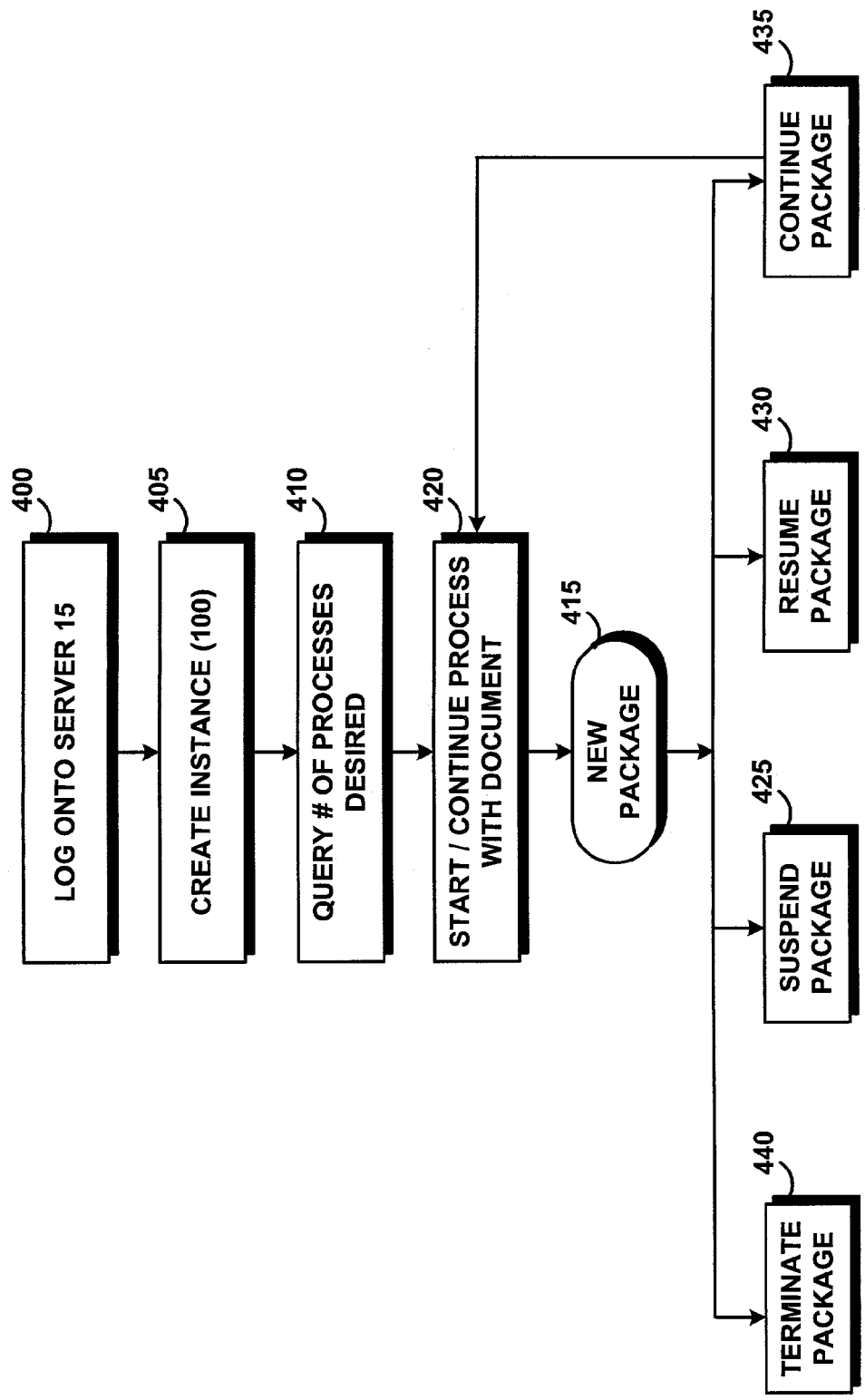
FIG. 4 is a process flow chart illustrating a method of executing a document routing process according to the present invention.

A method of executing the process for routing documents is described in FIG. 4. The user initiates process execution by first logging onto the server 15 at step 400, and by creating an instance at step 405. The user queries how many processes are available at step 410.

Based on the process required, system 10 can start the process with the document at step 420. A work package is then created at step 415. From step 420, the process may suspend the package 415 at step 425, as defined by the user. The package 415 may be suspended for a predetermined period of time such as 60 minutes, or until a condition is met, such as the presence of a predetermined set of packages. The criteria for suspension or resumption is defined by the DKResumeListEntryICM class 180 (FIG. 2). The process can be resumed at any time at step 430, allowing the package 415 to continue through the process at step 435. When the work package is routed to the next work node, it will be deleted from the system, and a new work package will be created at step 415 again. Once the package has been routed through all the nodes, the process is terminated at step 440.

Figure 5:
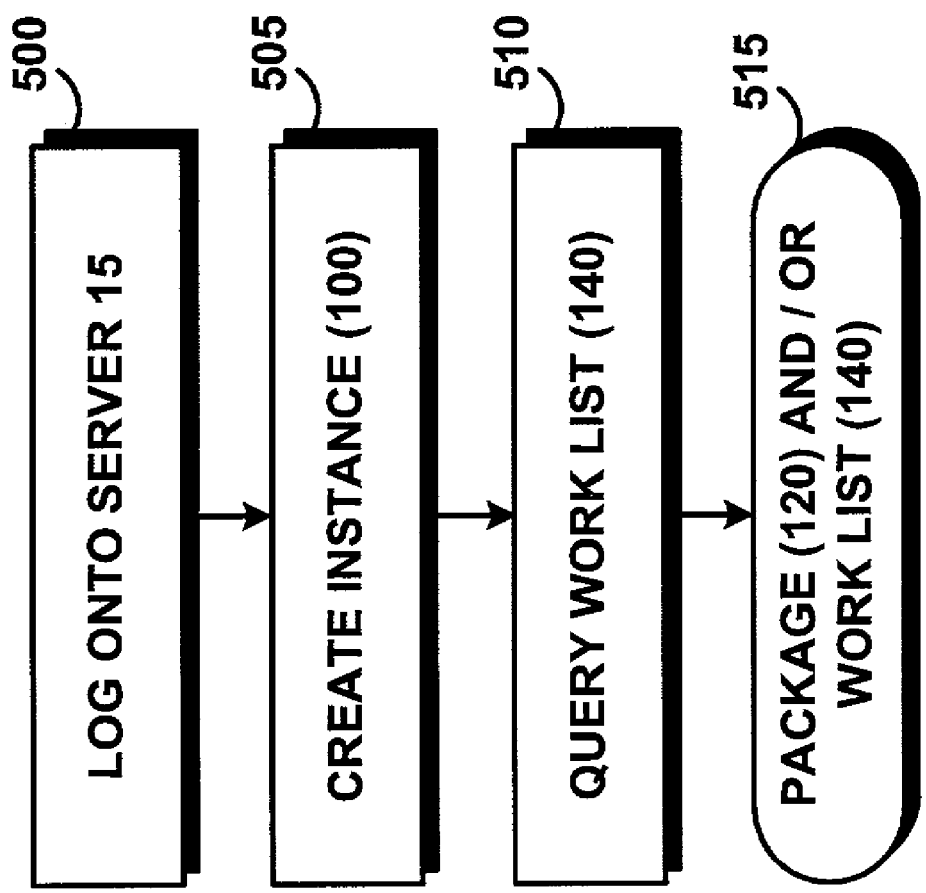
FIG. 5 is a process flow chart illustrating a method of querying a work package according to the present invention.

The method of querying the package is described in FIG. 5. The user logs onto the server 15 at step 500 and then creates instance at step 505. At step 510, the user may query the work list 140 in such a manner that the response at step 515 is the package 415, or the worklist 140. For example, a business with multiple employees uses the system 10 to manage document routing within the company organization. Each employee is assigned a worklist 140. At any time, the employee can query their specific worklist 140; the content of the worklist is packages requiring the employee's attention. The worklist 140 represents the employee's workload.

It is to be understood that the specific embodiments of the invention that have been described are merely illustrative of certain application of the principle of the present invention. Numerous modifications may be made to the object-oriented framework for document routing service in a content management system invention described herein without departing from the spirit and scope of the present invention. Moreover, while the present invention is described for illustration purpose only in relation to the WWW, it should be clear that the invention is applicable as well to any document routing system.

What is claimed is:

1. A computer implemented method for providing an object oriented framework for document routing, comprising:

defining a document routing process with a finite number of predefined stages:

executing the document routing process based on the stages to create work list;

querying the work list to create a work package;

presenting the work package in the object oriented framework to an application without an intermediate interface layer;

wherein presenting the work package in the object oriented framework comprises presenting the work package in a plurality of classes;

wherein presenting the work package in a plurality of classes comprises defining a first class that provides document routing functions;

wherein presenting the work package in a plurality of classes further comprises defining a second class that provides system administration support for document routing;

wherein presenting the work package in a plurality of classes further comprises defining a third class that provides on object oriented representation of a process in document routing;

wherein presenting the work package in a plurality of classes further comprises defining a fourth class that provides an object oriented representation of a work node in document routing:

wherein presenting the work package in a plurality of classes further comprises defining a fifth class that provides an object oriented representation of a work list in document routing;

wherein presenting the work package in a plurality of classes further comprises defining a sixth class that provides an object oriented representation of an entry of a route list in a process in document routing;

wherein presenting the work package in a plurality of classes further comprises defining a seventh class that provides an object oriented representation of an entry of a resume list in a work node;

wherein presenting the work package in a plurality of classes further comprises defining an eight class that provides an object oriented representation of the work package in document routing and that routes the work package between work nodes in a process; and wherein presenting the work package in a plurality of classes further comprises defining a ninth class that provides on object oriented representation of an entry of the resume list in the work package.

2. The method of claim 1, wherein defining the first class comprises providing a basic document routing service.

3. The method of claim 2, wherein providing the basic document routing service comprises performing any one or more of the following tasks: starting, terminating, continuing, suspending, and resuming a process.

4. The method of claim 1, wherein defining the document routing process with a finite number of predefined stages comprises:
  retrieving an instance;
  defining a number of work nodes required to complete the document routing process; and
  defining work lists.

5. The method of claim 4, wherein executing the document routing process based on the stages to create the work package comprises:
  creating an instance;
  determining a number of processes that are available; and
  creating the work package.

6. The method of claim 5, wherein querying the work package comprises:
  creating an instance; and
  querying a work list resulting in any of the work package or the work list.

7. A computer-readable medium encoded with a computer program for providing an object oriented framework for document routing, comprising:
  a first set of instructions for defining a document routing process with a finite number of predefined stages;
  a second set of instructions for executing the document routing process based on the stages to create a work list;
  a third set of instructions for querying the work list to create a work package;
  a fourth set of instructions for presenting the work package in the object oriented framework to an application without an intermediate interface layer;
  wherein the fourth set of instructions for presenting the work package in the object oriented framework comprises a plurality of classes;
  wherein the plurality of classes comprise a first class that provides document routing functions;
  wherein the plurality of classes comprise a second class that provides system administration support for document routing;
  wherein the plurality of classes comprise a third class that provides an object oriented representation of a process in document routing;
  wherein the plurality of classes comprise a fourth class that provides an object oriented representation of a work node in document routing;
  wherein the plurality of classes comprise a fifth class that provides an object oriented representation of a work list in document routing;
  wherein the plurality of classes comprise a sixth class that provides an object oriented representation of an entry of a route list in a process in document routing;
  wherein the plurality of classes comprise a seventh class that provides an object oriented representation of an entry of a resume list in a work node;
  wherein the plurality of classes comprise an eight class that provides an object oriented representation of the work package in document routing and that routes the work package between work nodes in a process; and
  wherein the plurality of classes comprise a ninth class that provides an object oriented representation of an entry of the resume list in the work package.

* * * * *